H. ROBINSON.
VEGETABLE PARING MACHINE.
APPLICATION FILED MAR. 19, 1914.
1,114,290.
Patented Oct. 20, 1914.
2 SHEETS—SHEET 1.
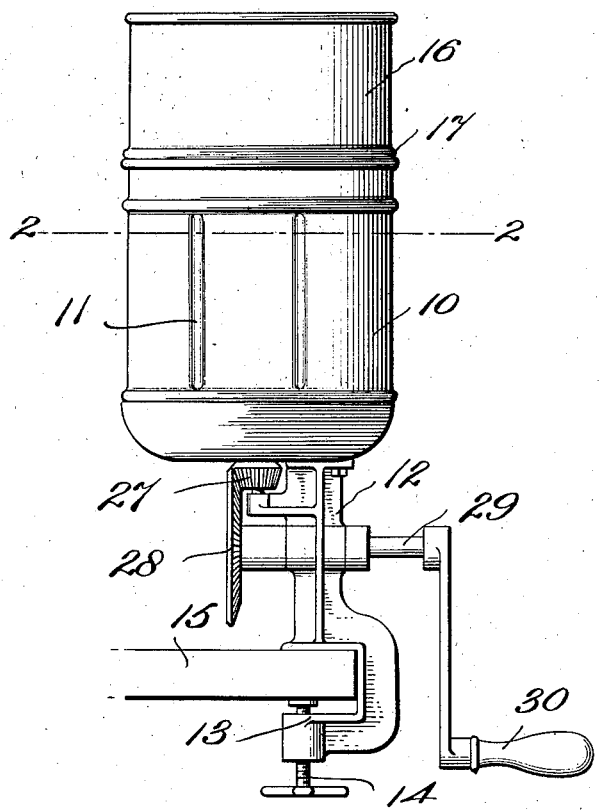
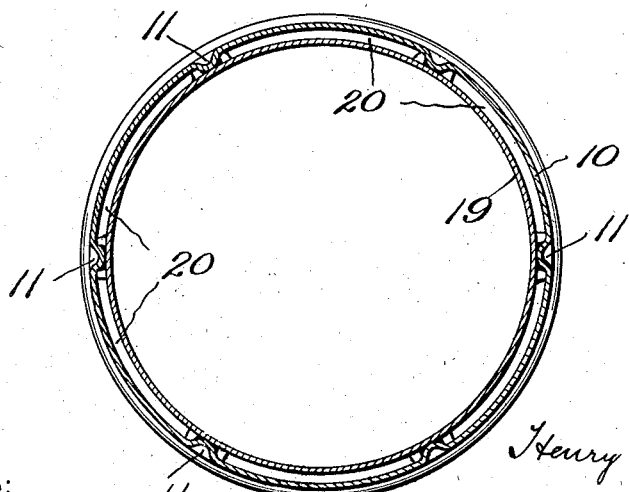
Witnesses:
Henry Robinson
Inventor
By his Attorneys
Wilkinson, Giusta and MacKaye H. ROBINSON.
VEGETABLE PARING MACHINE.
APPLICATION FILED MAR. 19, 1914.
1,114,290.
Patented Oct. 20, 1914.
2 SHEETS—SHEET 2.
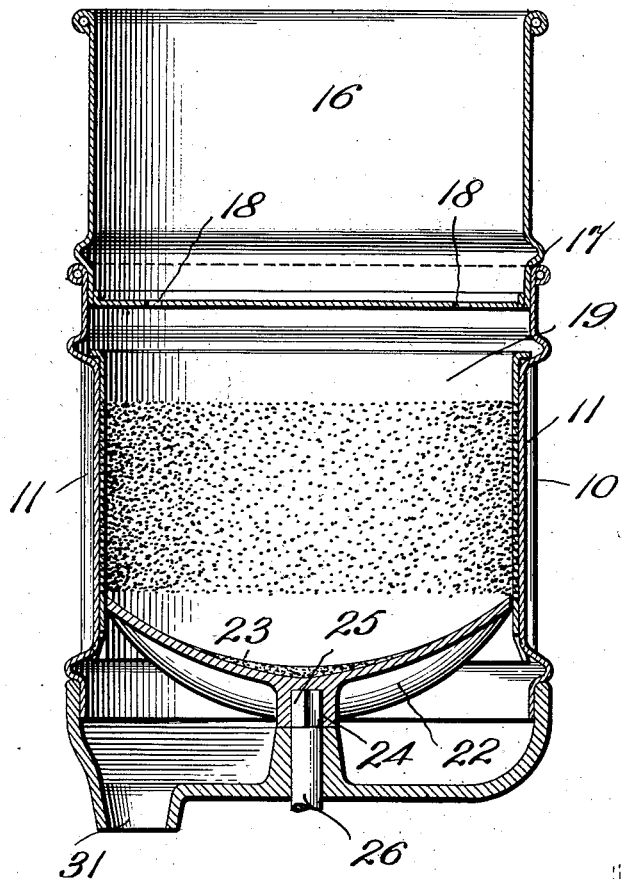
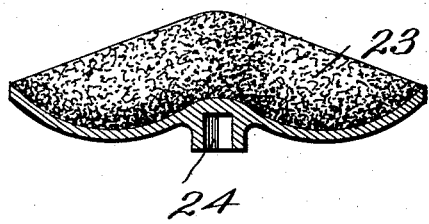
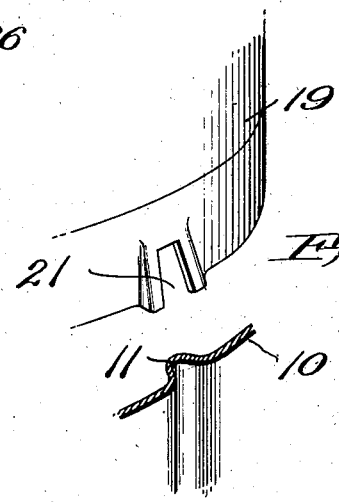
Witnesses:
James Ronin
Geo. F. Bepue.
Henry Robinson
Inventor
By his Attorneys
Wilkinson, Ciusta and MacKaye

UNITED STATES PATENT OFFICE.

HENRY ROBINSON, OF SOUTH ORANGE, NEW JERSEY.

VEGETABLE-PARING MACHINE.

1,114,290.  Specification of Letters Patent.  Patented Oct. 20, 1914.

Application filed March 19, 1914. Serial No. 825,762.

*To all whom it may concern:*

Be it known that I, HENRY ROBINSON, a citizen of the United States, residing at South Orange, in the State of New Jersey, have invented certain new and useful Improvements in Vegetable-Paring Machines; and I do hereby declare the following to be a full, clear, and exact description of the invention, such as will enable others skilled in the art to which it appertains to make and use the same.

The present invention has relation to a cheap, light, reliable and easily cleaned machine of great efficiency, whereby a small number of potatoes or the like may be rapidly peeled without handling and within a small space.

The invention is particularly intended for application to household use, where it can be embodied in apparatus which is easily portable and can be attached to a wall, table, sink or tubs, as desired.

The invention, in a preferred form, is illustrated in the accompanying drawings wherein—

Figure 1 is a side elevation of the entire device, Fig. 2 is a section of the container and lining on the plane 2—2 of Fig. 1, Fig. 3 is a vertical median section of the upper portions of the device, Fig. 4 is a section of the rotary supporting and peeling member, and Fig. 5 shows a detail in perspective.

The specific device as shown comprises a container 10 preferably made of sheet iron or steel and preferably provided with ribs 11 pressed inward as shown; which container is preferably supported by a casting 12 having a jaw 13 provided with a pressure screw 14 in a well known manner, whereby the whole can be attached to a table 15 or other supporting projection. The container 10 supports the removable water reservoir 16, which preferably fits onto the top of the container and has a bead 17 whereby the said reservoir is supported. The bottom of the reservoir is perforated and two openings are shown at 18. Upon this reservoir being filled with water, the perforations will cause a distribution over the contents of the container.

I prefer to employ a removable sheet iron or steel lining 19 which fits into the container 10, being snugly confined by the ribs 11 as clearly shown in Fig. 2; thereby affording plenty of room in the spaces 20 for the disposition of the particles of peel as they are removed. This lining is roughened on the interior and this is preferably accomplished by punching holes inward in a well known manner, so that as the potatoes or other vegetables are circulated and thrown outward and upward against this perforated casing, the particles of peel are removed by the edges of the openings and escape, to a certain extent, through the spaces 20 between the lining and the container. In order to insure the lining 19 being firmly held and not being permitted to revolve, I prefer to cut away the same opposite the ribs 11 as shown at 21 in Fig. 5, bending the immediate edges of the opening 21 outward and thus forming a socket which slides down each rib 11 for the purpose above stated.

The rotary impelling and peeling member consists preferably of a casting 22 having carborundum or equivalent material cast into its upper face to provide an abradant surface. The peculiar shape of this member has been carefully determined by experiment and its characteristics are quite different from those which are appropriate in the larger types of machine which have hitherto been made. The shape of the member is shown in Figs. 3 and 4 by two sections at right angles to each other, and it will be seen that the member in question is saddle-shaped, with a concave portion on each side of the ridge of the saddle. Fig. 4 is taken on a section plane at right angles to the right of the saddle, while Fig. 3 is taken on a plane in the line of the ridge. The concave portions on each side of the ridge should be so proportioned and shaped as substantially to conform to the shape of a large potato, and in practice these machines are best made in such proportions that each concavity will receive from one large to two or three smaller potatoes.

I have found by experiment that a disk of the saddle-shape shown and described will act efficiently to circulate a deep mass of potatoes within the lining 19, while at the same time causing the skin to be removed, principally by the surface 23 of the member 22 but also to a considerable extent by the lining. The rotation of the member 22 can be accomplished in any well known manner as, for instance, by supplying a socket 24 which can be placed over the square end 25 of a shaft 26 whose lower end is provided with a beveled gear 27. This beveled gear is driven by another beveled gear 28 on the shaft 29 turned by the handle 30. The debris passes out partly through the openings in the lining 19 and partly over the edge of the member 22 which may itself be perforated if desired. The portion which passes downward from the member 22 is carried off by the water through the opening 31.

The lining 19 can be readily removed and cleaned. This is a very important feature in machines of this character and, indeed it is important that the whole interior of the device should be capable of being easily reached in all parts for cleaning, as is the case with the device shown. The rotating member 22 can, of course, be lifted off of the shaft 26 whenever desired.

Various changes may be made in this device without departing from this invention and I do not limit myself to the details herein shown and described.

What I claim is—

1. A vegetable peeling machine comprising a container made in two parts, one of which has an abrading surface and slips within the other part; one of said parts being provided with ribs whereby a space is provided between the two parts, substantially as described.

2. A vegetable peeling machine having an outer container with inwardly projecting ribs and an inner lining adapted to slide down between said ribs, said lining having an abradant inner surface, substantially as described.

3. In a vegetable peeling machine, an outer container having inwardly projecting ribs and a removable abradant lining adapted to slide down and be confined between said ribs, said lining having openings with projecting sides fitting over said ribs to prevent the lining from turning, substantially as described.

4. In a vegetable peeling machine, a rotary peeling and supporting member having a concave abradant surface formed to provide a median ridge with curved concave surfaces falling away from each side thereof, substantially as described.

5. In a vegetable peeling machine, a rotary peeling and supporting member having an abrading surface formed to provide a median ridge raised on both ends and sloping gradually outward to form a concave surface on each side of said ridge, substantially as described.

6. In a vegetable peeling machine, a concave saddle-shaped rotary, peeling and supporting member, substantially as described.

In testimony whereof, I affix my signature, in presence of two witnesses.

HENRY ROBINSON.

Witnesses:
JOSEPH WERTZHEISER,
FRANK GONZALES.